(12) United States Patent
Sasaki et al.

(10) Patent No.: US 6,346,937 B1
(45) Date of Patent: Feb. 12, 2002

(54) DEVICE HAVING A DISPLAY

(75) Inventors: Gen Sasaki, Toyonaka; Masahito Niikawa, Sakai, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/361,402

(22) Filed: Jul. 27, 1999

(30) Foreign Application Priority Data

Jul. 28, 1998 (JP) .............................................. 10-212635

(51) Int. Cl.$^7$ ................................................. G09G 5/00
(52) U.S. Cl. ........................ 345/211; 348/372; 396/301
(58) Field of Search ............................... 345/211, 212, 345/213; 713/320, 323, 324, 340; 348/372; 396/301, 303

(56) References Cited

U.S. PATENT DOCUMENTS

| 3,755,806 | A | * | 8/1973 | Bunting | |
| 3,955,185 | A | * | 5/1976 | Nishimura | |
| 5,247,286 | A | * | 9/1993 | Ishikawa | 345/211 |
| 5,375,245 | A | * | 12/1994 | Solhjell et al. | 345/212 |
| 5,576,738 | A | * | 11/1996 | Anwyle et al. | 345/212 |
| 6,005,559 | A | * | 12/1999 | Miyamoto | 345/212 |
| 6,020,879 | A | * | 2/2000 | Nakabayashi | 345/212 |
| 6,075,949 | A | * | 6/2000 | Hatakenaka et al. | 348/372 |

FOREIGN PATENT DOCUMENTS

| JP | 62-179636 | 11/1987 |
| JP | 07210273 | 11/1995 |
| JP | 2659206 | 6/1997 |
| JP | 09307799 | 11/1997 |

* cited by examiner

Primary Examiner—Regina Liang
(74) Attorney, Agent, or Firm—McDermott, Will & Emery

(57) ABSTRACT

A digital camera having a display unit for displaying an image is designed to operate on electric power from an internal power source or from an external power source. When no operation is performed for a predetermined length of time, if the internal power source is used, supply of electric power is shut off to stop operation of the entire camera and, if the external power source is used, supply of electric power to the display unit is shut off but operation other than displaying of an image is continued irrespective of whether the camera is operated or not.

13 Claims, 7 Drawing Sheets

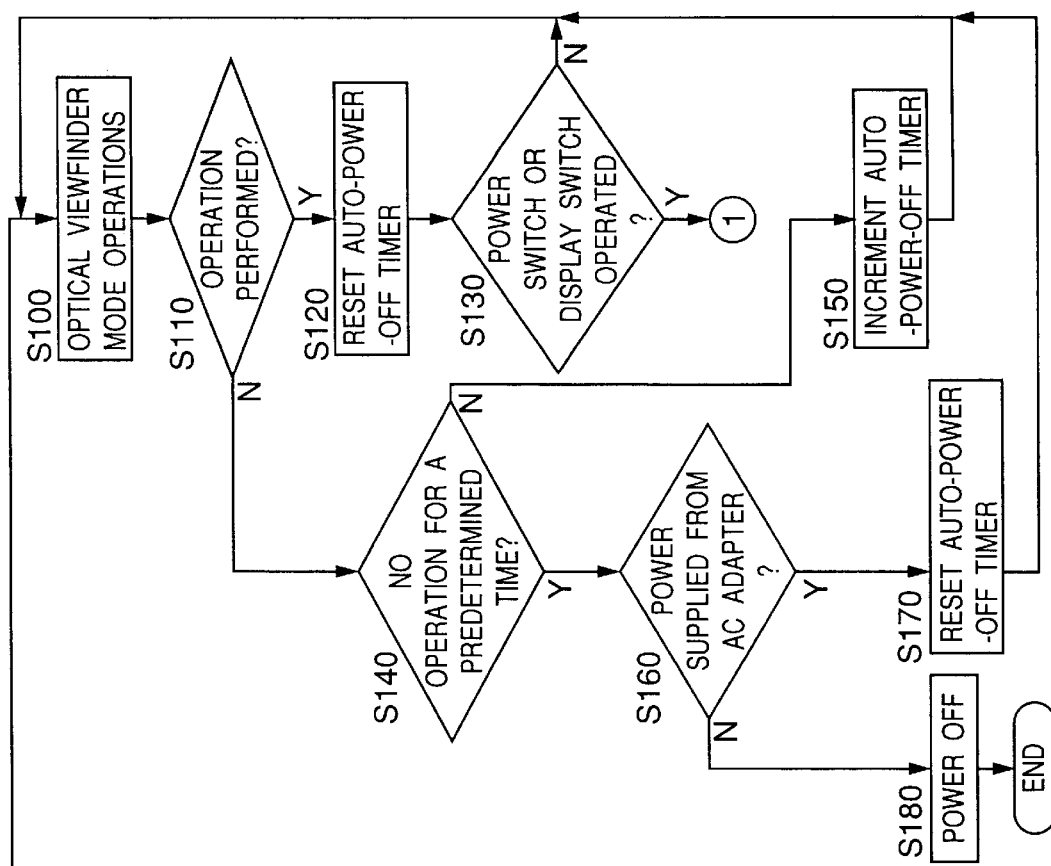
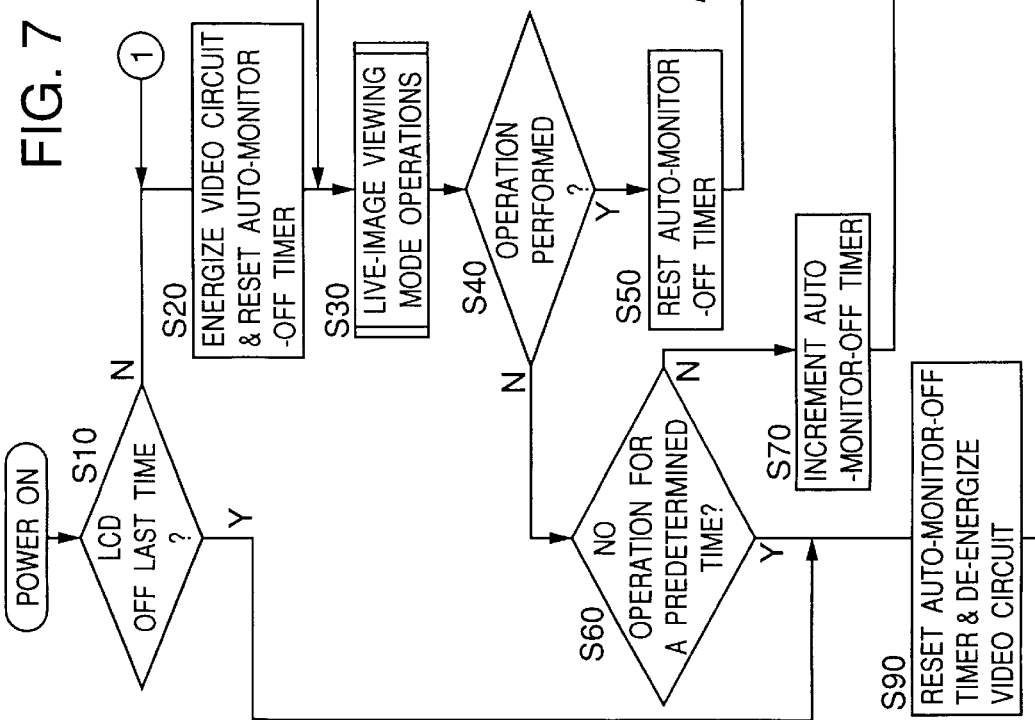
FIG. 7

DEVICE HAVING A DISPLAY

This application is based on application No. H10-212635 filed in Japan on Jul. 28, 1998, the entire content of which is hereby incorporated by reference.

BACKGROUND OF THE INVENTION

1. Field of the Invention

The present invention relates to a device such as a digital camera, and particularly to a device having a display for displaying an image. The invention relates to a device powered by an external/internal power source.

2. Description of the Prior Art

Many digital cameras are provided with a display unit such as a backlit LCD (liquid crystal display) so as to allow viewing of a live image during shooting and viewing of a recorded image after shooting. Since digital cameras are typically carried around as they are used, most digital cameras use a battery as a source of electric power they require to operate.

However, the capacity of batteries available today is insufficient to meet the power consumption of digital cameras for many hours. Accordingly, when a digital camera is used in a situation where portability is not required such as when it is used in a state connected to a personal computer, an external power source such as an AC adapter is used. Moreover, to alleviate depletion of a battery as much as possible, digital cameras are usually provided with a function of, when no operation is performed for a predetermined length of time, shutting off supply of electric power to at least part of its display unit including an LCD and a video circuit, or a function of, in such a situation, shutting off supply of electric power to the entire digital camera. In the present specification, the former function will be referred to as the automatic-monitor-off function and the latter function as the automatic-power-off function.

Note that the automatic-power-off function may be achieved by cutting off an electric power supply path in such a way that supply of electric power is restarted only when the path is closed again directly by mechanical operation of a switch, or by bringing a camera into a so-called sleep state, i.e. a stand-by state in which its controller itself is kept in operation and waits for entry of a command that requests starting of a switching device such as a transistor by which an electric power supply path from a power source is opened or closed.

However, some conventional digital cameras are so designed that the automatic-power-off function is maintained even when they are operating on electric power fed from an external power source. With such digital cameras, even in a situation where the use of an external power source eliminates the risk of battery depletion, their operation may be suddenly interrupted in the middle of their use as a result of supply of electric power being shut off automatically. On the other hand, some other conventional digital cameras are so designed that the automatic-power-off function is disabled when they are operating on electric power fed from an external power source. With such digital cameras, although such interruption of operation as mentioned above can be avoided, their display unit may be damaged by overheating as a result of being kept energized for long hours.

SUMMARY OF THE INVENTION

An object of the present invention is to provide a device that ensures alleviated depletion of a built-in battery and that offers enhanced user-friendliness and safety when operating from an external power source.

To achieve the above object, according to one aspect of the present invention, a device that operates from an internal power source or from an external power source is provided with: a display unit for displaying an image; and a controller that counts the time that has elapsed after execution of a predetermined operation so that, if the device is operating from the internal power source, operation of the entire device is ended when a predetermined length of time has been counted and, if the device is operating from the external power source, operation of the display unit is ended but operation of the other portions of the device is continued when a predetermined length of time has been counted.

According to another aspect of the present invention, a device that operates from an internal power source or from an external power source is provided with: a display unit for displaying an image; and a controller that, when no operation has been performed for a predetermined length of time, ends operation of the entire device, if the device is operating from the internal power source, and ends operation of the display unit but continues operation of the other portions of the device, if the device is operating from the external power source.

According to still another aspect of the present invention, a device that operates from an internal power source or from an external power source is provided with: a display unit for displaying an image; and a controller that, when no operation has been performed for a first predetermined length of time, ends operation of the display unit and, when no operation has been performed for a second predetermined length of time that is longer than the first predetermined length of time, ends operation of the entire device only if the device is operating from the internal power source.

BRIEF DESCRIPTION OF THE DRAWINGS

This and other objects and features of the present invention will become clear from the following description, taken in conjunction with the preferred embodiments with reference to the accompanying drawings in which:

FIGS. 7 and 8 are flow chart showing the flow of control performed in connection with supply of electric power and display of an image in the digital camera of the embodiment.

DESCRIPTION OF THE PREFERRED EMBODIMENTS

Figure 1:
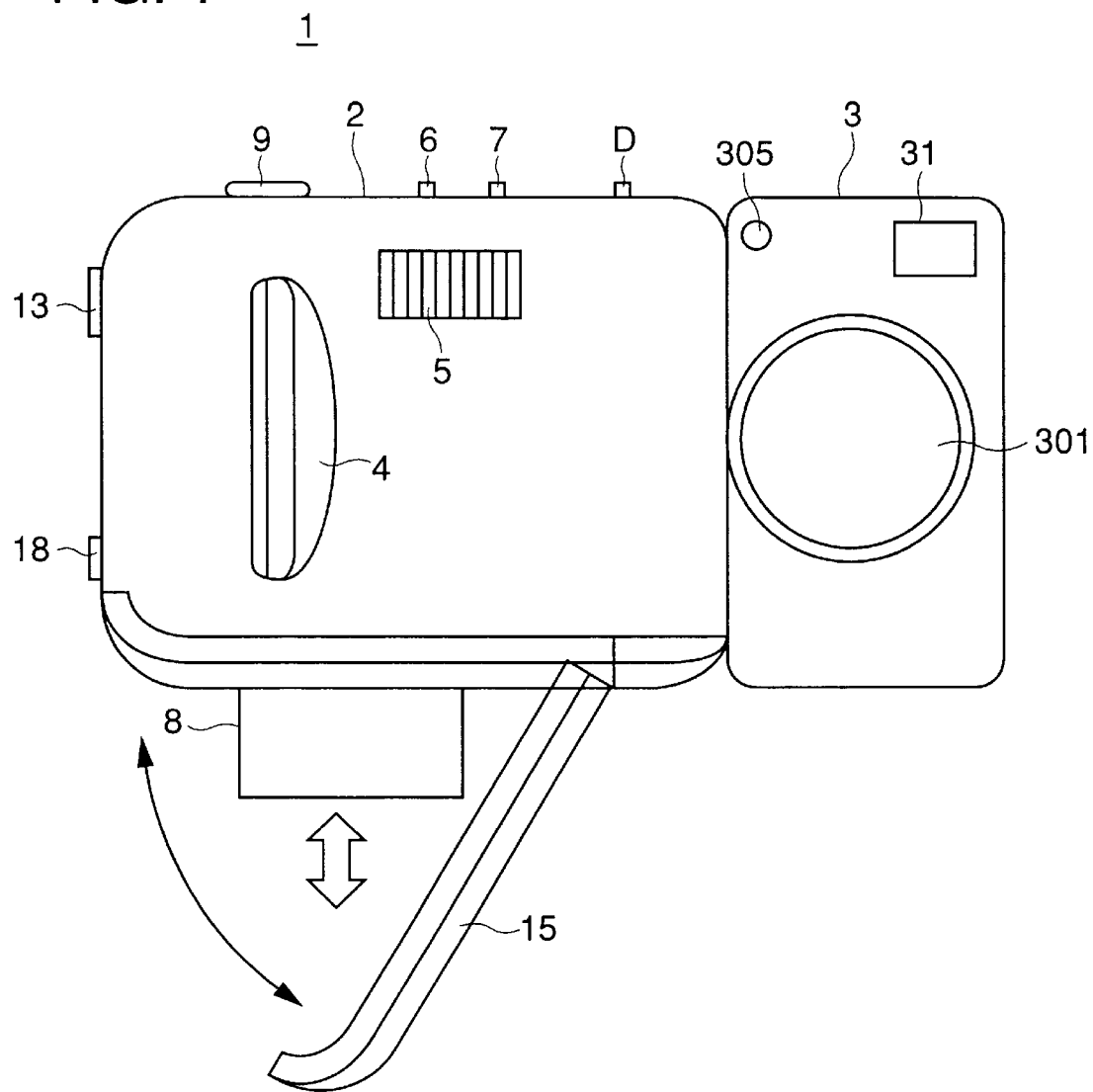
FIG. 1 is a front view of a digital camera embodying the invention.
Figure 2:
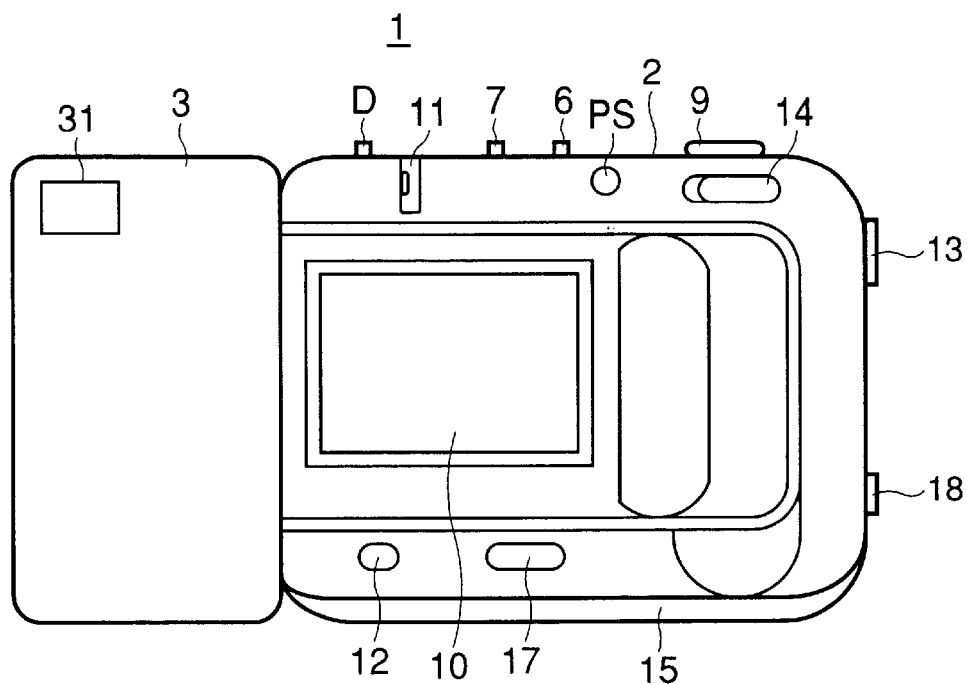
FIG. 2 is a rear view of the digital camera of the embodiment.
Figure 3:
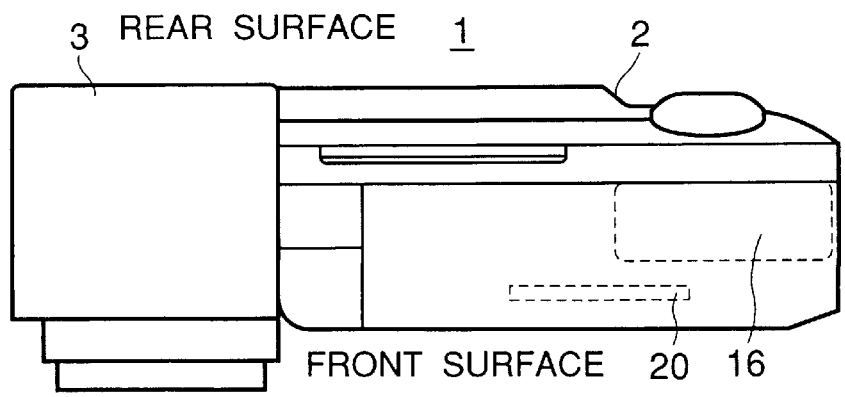
FIG. 3 is a bottom view of the digital camera of the embodiment.
Figure 4:
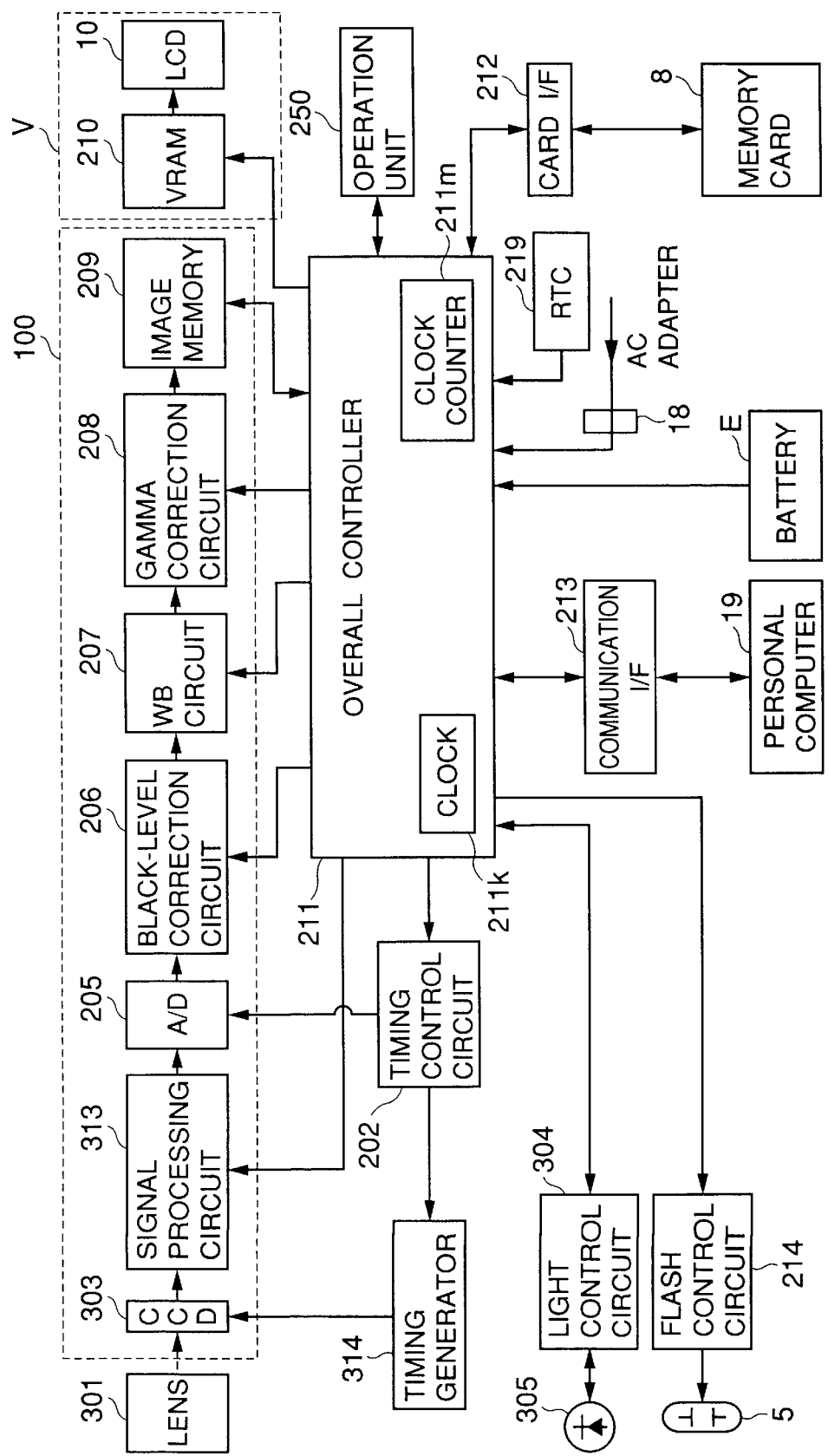
FIG. 4 is a block diagram showing the outline of the circuit configuration of the digital camera of the embodiment.

Hereinafter, a digital camera embodying the present invention will be described with reference to the accompanying drawings. FIGS. 1, 2, and 3 are a front view, a rear view, and a bottom view of a digital camera 1 as an embodiment of the invention. FIG. 4 is a block diagram showing the outline of the circuit configuration of the digital camera 1.

The digital camera 1 is composed of a camera body unit 2 having the shape of a box and an image sensing unit 3 having the shape of a rectangular parallelopiped. The image sensing unit 3 is detachably attached to the left-hand side surface of the camera body unit 2, as seen from the user holding the digital camera 1. The image sensing unit 3 performs photoelectric conversion to convert an optical image of the object into an image signal.

The image sensing unit 3 has a taking lens 301 having a zooming function provided on its front surface, and has an image sensing circuit including a CCD (charge-coupled device) color area sensor 303 provided in an appropriate position behind the zoom lens 301. The image sensing unit 3 further has an optical viewfinder 31 as is well known in silver-halide film lens-shutter cameras, and also has a light control circuit 304 having a light control sensor 305 that senses the flash light reflected from the object.

The camera body unit 2 has an LCD 10, a chamber 20 for housing a memory card 8, and a connection terminal 13 to which a personal computer is externally connected. The principal function of the camera body unit 2 is to perform signal processing on the image signal obtained from the above-described image sensing unit 3 and then perform operations necessary to display the image signal on the LCD 10, record it on the memory card 8, and transfer it to a computer.

As shown in FIG. 1, the camera body unit 2 has a grip portion 4 formed in an appropriate position in its front surface near the right-hand side surface, and has a built-in flash 5 provided in an appropriate position on its top surface near the image sensing unit 3. Moreover, roughly at the center of the top surface of the camera body unit 2, frame advance switches 6 and 7 are provided that are used to achieve frame-by-frame advance of the recorded images when they are reproduced. The switch 6 (hereafter referred to as the up switch) is operated to advance the recorded images in the direction in which the frame number increases (i.e. in order of occurrence of shooting), and the switch 7 (hereafter referred to as the down switch) is operated to advance the recorded images in the direction in which the frame number decreases. On the left of the down switch 7 is provided an erase switch D for erasing an image recorded on the memory card 8, and on the right of the up switch 6 is provided a shutter button 9.

As shown in FIG. 2, the camera body unit 2 has an LCD 10 provided roughly at the vertical center of its rear surface near the left-hand side surface. The LCD 10 is used to display an image to be shot for monitoring purposes (thus serving as a viewfinder), to display an image reproduced from recorded data, and for other purposes. Below the LCD 10 are provided a compression rate setting slide switch 12 for switching the compression rate K of the image data stored in the memory card 8, and a display switch 17 for shutting off supply of electric power to a video circuit V including the LCD 10 to alleviate depletion of a battery E when the optical viewfinder 31 is used. Every time the display switch 17 is pressed, the LCD 10 toggles between on and off.

In the upper portion of the rear surface of the camera body unit 2 are provided, from the right-hand side surface, a shooting/playback mode setting switch 14 for switching between a "shooting mode" and a "playback mode", a power switch PS, and an FL mode setting switch 11 for switching the mode of flash light emission.

The "shooting mode" is a mode in which images are shot, and the "playback mode" is a mode in which the images shot and recorded on the memory card 8 are reproduced and displayed on the LCD 10. The shooting/playback mode setting switch 14 is a two-contact slide switch; for example, when it is slid rightward, the playback mode is started and, when it is slid leftward, the shooting mode is started.

With respect to emission of flash light, the digital camera 1 has the following modes: an "automatic flash mode" in which the built-in flash 5 is made to emit flash light in accordance with the brightness of the object, a "forced flash mode" in which the built-in flash 5 is made to emit flash light forcibly irrespective of the brightness of the object, and a "no flash mode" in which emission of flash light by the built-in flash 5 is inhibited. Every time the FL mode setting switch 11 is pressed, the flash mode is switched cyclically among the "automatic flash", "forced flash", and "no flash" modes so that one of these modes is selected and established.

The digital camera 1 allows switching of the compression rate K between two values, specifically ⅛ and 1/20. For example, when the compression rate setting switch 12 is slid rightward, the compression rate K is set at ⅛ and, when the same switch is slid leftward, the compression rate K is set at 1/20. Although this embodiment allows switching of the compression rate K between two values, it is also possible to allow selection of the compression rate K among three or more values.

In the bottom surface of the camera body unit 2, a battery chamber 16 and a card chamber 20 for housing the memory card 8 are provided. The openings to these chambers 16 and 20 are closed with a clam-shell-type lid 15. The digital camera 1 of this embodiment uses, as a source of electric power to be supplied to whichever portion thereof requires electric power for operation, a battery E composed of four AA-type dry cells connected in series. It is also possible to use an external power source in place of the battery E.

On the right-hand side surface of the camera body unit 2 is provided, in addition to the connection terminal 13 to which a personal computer is externally connected, a terminal 18 to which an AC adapter for converting the commercial alternating-current power to a direct current is connected. Supply of electric power is controlled by the overall controller 211 described later. When an AC adapter is connected, the overall controller 211, detecting the potential at the connector 18, shuts off supply of electric power from the battery E.

As shown in FIG. 4, to achieve shooting of an image, the digital camera 1 is provided with a shooting section 100 constituted by the CCD 303, a signal processing circuit 313, an A/D (analog-to-digital) converter 205, a black-level conversion circuit 206, a WB (white balance) circuit 207, a gamma correction circuit 208, and an image memory 209. Moreover, to achieve display of an image, the digital camera 1 is provided with a display section (video circuit) V constituted by the LCD 10 and a VRAM (video random-access memory) 210. Of the constituent blocks of the shooting section 100, the CCD 303, the signal processing circuit 313, and the A/D converter 205 are provided in the image sensing unit 3, and the other blocks are provided in the camera body unit 2.

Moreover, the digital camera 1 is provided with an overall controller 211 for controlling the entire digital camera including the camera body unit 2 and the image sensing unit 3, and a timing control circuit 202 for generating a clock that is necessary to control the shooting section 100. The timing control circuit 202 is controlled by the overall controller 211.

The light from the object is focused by the zoom lens 301 to form an image of the object on the CCD 303, which is then subjected to photoelectric conversion by the CCD 303 so as to be output as an image signal carrying the R (red), G (green), and B (blue) components of the image (a signal composed of a series of pixel signals obtained from the individual pixels). In the image sensing unit 3, where the aperture is fixed, exposure is controlled by adjusting the exposure amount of the CCD 303, i.e. the charge accumulation time thereof, which corresponds to the shutter speed.

When the brightness of the object is too low to set an appropriate shutter speed, underexposure is compensated for by adjusting the level of the image signal output from the CCD 303. That is, when the brightness is low, exposure is controlled by shutter speed adjustment in combination with gain adjustment. Adjustment of the level of the image signal is achieved by gain adjustment performed by an AGC (automatic gain control) circuit provided in the signal processing circuit 313.

The timing generator 314, on the basis of a reference clock fed from the timing control circuit 202, generates signals with which to control the driving of the CCD 303. For example, the timing generator 314 generates clock signals such as a timing signal used to determine the starting/ending of integration (the starting/ending of exposure) and read control signals (horizontal and vertical synchronizing signals, transfer signals, etc.) used to control reading of signals produced as the individual pixels sense light, and feeds those signals to the CCD 303.

The signal processing circuit 313 performs predetermined analog signal processing on the image signal (an analog signal) output from the CCD 303. The signal processing circuit 313 has a CDS (correlated double sampling) circuit and an AGC circuit The CDS circuit performs noise reduction on the image signal, and the level of the image signal is adjusted by adjusting the gain of the AGC circuit.

The A/D converter 205 converts the individual pixel signals included in the image signal into a 10-bit digital signal. The A/D converter 205, in synchronism with a clock for AID conversion it receives from the timing generator 202, converts the individual pixel signals (analog signals) into a 10-bit digital signal.

The black-level correction circuit 206 corrects the black level of the pixel signals that have undergone A/D conversion (hereafter referred to as the pixel data) to make it equal to the reference black level. The WB circuit 207 performs level conversion of the pixel data of each of the R, G, and B color components so that a proper white balance is achieved after gamma correction. The WB circuit 207 performs level conversion of the pixel data of each of the R, G, and B color components by using a level conversion table fed thereto from the overall controller 211. The conversion coefficients (the slopes of characteristics) for the individual color components constituting the level conversion table are determined by the overall controller 211 for each image shot The gamma correction circuit 208 corrects the gamma characteristic of the pixel data. The gamma correction circuit 208 has six gamma correction tables each having a different gamma characteristic so that gamma correction is performed on the pixel data by using an appropriate gamma correction table in accordance with the shooting scene and shooting conditions.

The image memory 209 stores the pixel data output from the gamma correction circuit 208. The image memory 209 has a storage capacity that corresponds to one frame. That is, if it is assumed that the CCD 303 has n rows×m columns of pixels, the image memory 209 has a storage capacity that corresponds to n×m pixels, and the pixel data of the individual pixels is stored at the corresponding locations in the image memory 209.

The VRAM 210 serves as a buffer memory for the image data that is reproduced for display on the LCD 10. The VRAM 210 has a storage capacity that corresponds to the number of pixels of the LCD 10.

In the shooting mode, the image sensing unit 3 senses an image of the object every 1/30 of a second. The pixel data of the individual pixels of the sensed image is subjected to predetermined signal processing by the black-level correction circuit 205 to the gamma correction circuit 208, is then stored in the image memory 209 and simultaneously transferred through the overall controller 211 to the VRAM 210 so as to be displayed on the LCD 10 (to allow live-image viewing). This allows the user to confirm the object image by viewing the image displayed on the LCD 10. On the other hand, in the playback mode, an image read from the memory card 8 is subjected to predetermined signal processing by the overall controller 211, and is then transferred to the VRAM 210 so as to be displayed on the LCD 10.

A card I/F (interface) 212 is an interface through which image data is written to and read from the memory card 8. A communication I/F 213 is an interface such as a USB (universal serial bus) interface for externally connecting a personal computer 19 for communication purposes.

The light control circuit 304 controls the amount of light emitted by the built-in flash 5 in flash shooting so that a predetermined amount of light as set by the overall controller 211 is emitted. In flash shooting, at the same time as exposure is started, the flash light reflected from the object is sensed by the light control sensor 305 so that, when the amount of the sensed light reaches a predetermined amount, the light control circuit 304 feeds a light control signal indicating that the amount of the sensed light has reached the predetermined amount to the overall controller 211. In response to the light control signal, the overall controller 211 immediately outputs a light emission stop signal.

A flash control circuit 214 controls light emission of the built-in flash 5. In accordance with a control signal fed from the overall controller 211, the flash control circuit 214 controls the built-in flash 5 in terms of whether to emit light or not, the amount of light emitted, the timing of light emission, and other factors. When the flash control circuit 214 receives a light emission stop signal during light emission, it immediately stops light emission of the built-in flash 5 forcibly, and thereby makes the amount of light emitted by the built-in flash 5 equal to the predetermined amount.

An RTC (real-time clock) 219 is a circuit that functions as a clock used to manage the shooting date and time. The RTC 219 is driven not by the battery E, but by a separate power source (not shown).

In an operation unit 250 are arranged the already-mentioned up switch 6, down switch 7, shutter button 9, FL mode setting switch 11, compression rate setting switch 12, shooting/playback mode setting switch 14, display switch 17, erase switch D, and power switch PS.

The overall controller 211 is composed of a microcomputer, and controls the operation of the digital camera 1 as a whole by organically controlling the driving of the individual components within the image sensing unit 3 and those within the camera body unit 2. Operation of the switches provided in the operation unit 250 is detected by the overall controller 211 and is used for control purposes. The overall controller 211 is provided with a clock 211k for generating a clock used to control its own operation, and a clock counter 211m for counting this clock to measure time. The counter 211m is used as a timer to achieve the later described automatic-monitor-off and automatic-power-off functions.

Figure 5:
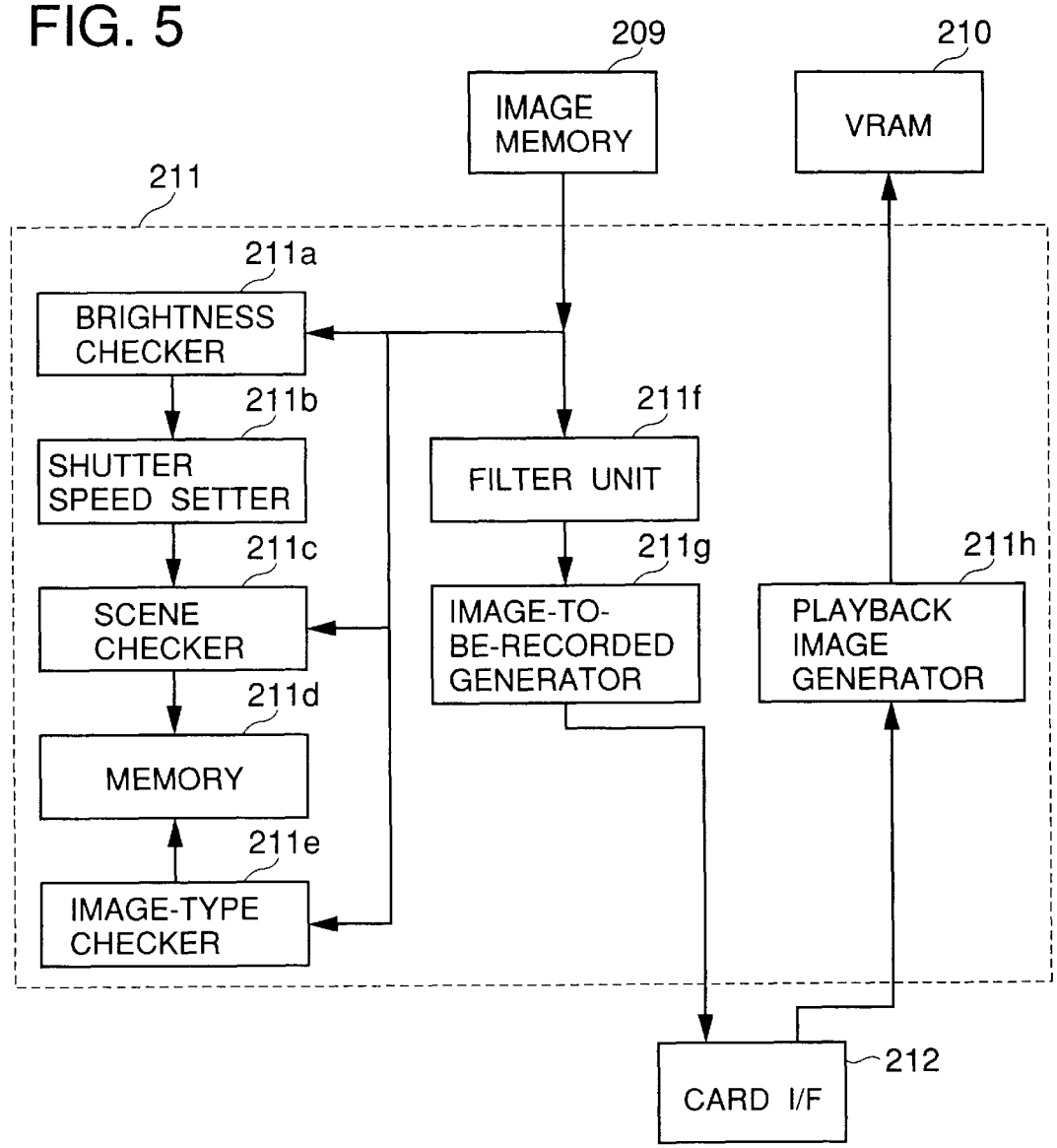
FIG. 5 is a block diagram showing the configuration of a portion related to shooting, recording, and reproducing of an image within the overall controller of the digital camera of the embodiment.

FIG. 5 is a block diagram showing the configuration of a portion related to shooting, recording, and reproducing of an image within the overall controller 211. The overall controller 211 has a brightness checker 211a and a shutter speed setter 211b, both for setting the exposure control value (shutter speed (SS)).

In a ready-to-record state, the brightness checker 211a checks the brightness of the object on the basis of the image sensed by the CCD 303 every 1/30 of a second. That is, the brightness checker 211a checks the brightness of the object by using the image data that is stored in the image memory 209 in such a way as to be updated periodically. The brightness checker 211a divides the storage area of the image memory 209 into nine blocks, and calculates the brightness data representative of each block by using the pixel data of the G (green) component included in each block.

On the basis of the result of checking of the brightness of the object by the brightness checker 211a, the shutter speed setter 211b determines the shutter speed (i.e. the integration time of the CCD 303). The shutter speed setter 211b has a table of the shutter speed SS. When the camera is started up, the shutter speed SS is initially set at 1/128 of a second. In the ready-to-record state, in accordance with the result of checking of the brightness of the object by the brightness checker 211a, the shutter speed setter 211b changes the shutter speed from the initial value to a higher or lower value stepwise.

Moreover, to achieve proper setting of the shutter speed SS, proper gamma correction, and proper filtering correction (described later) according to the shooting scene, the overall controller 211 also has a scene checker 211c for distinguishing four types of shooting scene, i.e. a "low-brightens scene", a "mid-brightness normal scene", a "mid-brightness back-lighted scene", and a "high-brightness scene".

The "low-brightens scene" is a scene typical in indoor shooting or in night-time shooting that usually requires auxiliary light emitted by a flash. The "mid-brightness normal scene" is a scene in which the main object is illuminated from the front by ambient light (including natural and artificial light) to a brightness appropriate for shooting without auxiliary light The "mid-brightness back-lighted scene" is a scene in which, although the overall brightness is appropriate, the object is illuminated from the back by ambient light and thus emission of flash light is desirable. The "high-brightness scene" is a scene in which the overall brightness is extremely high as in shooting on the sea or on a skiing ground under a bright sky.

The type of the scene distinguished by the scene checker 211c is stored in a memory 211d.

Furthermore, the overall controller 211 also has an image-type checker 211e for checking whether the image that is about to be shot is an image such as is typically targeted in shooting, for example a landscape or a portrait (hereafter this type of image will be referred to as a natural image), or an image such as contains characters or a chart written on a board (hereafter an image similar to this type of binary image will be referred to as a character image). On the basis of the pixel data stored in the image memory 209 that constitutes the image to be shot, the image-type checker 211e creates a histogram of the brightness data of the individual pixels, and, on the basis of this histogram, checks the type of the image to be shot In general, when the image to be shot is a natural image, the histogram of the brightness data of the image shows relatively normal distribution; that is, it has one peak value and thus exhibits so-called unimodal distribution. By contrast, when the image to be shot is a character image such as characters written on a white board, the histogram shows concentration of the brightness data on the white background and on the black characters; that is, it exhibits so-called bimodal distribution. Accordingly, the image-type checker 211e checks whether the image to be shot is a natural image or a character image by checking whether the histogram of the brightness data of the image exhibits unimodal or bimodal distribution. The result of this checking is also stored in the memory 211d.

The overall controller 211 further has, to achieve recording of the above-mentioned image to be shot, a filter unit 211f for performing filtering and an image-to-be-recorded generator 211g for generating a thumbnail image and a compressed image, and also has, to achieve reproduction of an image recorded on the memory card 8 and display thereof on the LCD 10, a playback image generator 211h.

The filter unit 211f corrects the high-frequency component of the image to be shot by using digital filters so as to correct the quality of the image in terms of edges contained therein. The filter unit 211f has five types of digital filters for each of the compression rates K=1/8 and 1/20, namely one digital filter for performing standard edge correction, two types of digital filters for sharpening edges relative to standard edge correction, and two types of digital filters for softening edges relative to standard edge correction.

The image-to-be-recorded generator 211g reads the pixel data from the image memory 209 and generates a thumbnail image and a compressed image that are to be recorded on the memory card 8. The image-to-be-recorded generator 211g, while scanning the image memory 209 in the raster scanning direction, reads the pixel data every eight pixels both horizontally and vertically and transfers the thus read data sequentially to the memory card 8. In this way, the image-to-be-recorded generator 211g generates a thumbnail image and concurrently records it on the memory card 8.

Moreover, the image-to-be-recorded generator 211g reads all of the pixel data from the image memory 209, subjects it to predetermined compression processing including two-dimensional DCT (discrete cosine transform) and Huffman encoding in a manner complying with the JPEG standard to generate data of a compressed image, and then records the data of the compressed image in the principal image area on the memory card 8.

In the shooting mode, when the shutter button 9 is operated to command recording of an image, the overall controller 211 generates, from the image sensed and stored in the image memory 209 after the command to record, a thumbnail image and also a compressed image compressed at the compression rate K set by the compression rate setting switch 12 in compliance with the JPEG standard. The overall controller 211 records these two images on the memory card 8 together with the tag data related to the image shot (i.e. data such as the frame number, the exposure value, the shutter speed, the compression rate K, the shooting date, the shooting time, whether the flash was used or not, the scene type, and the image type).

Figure 6:
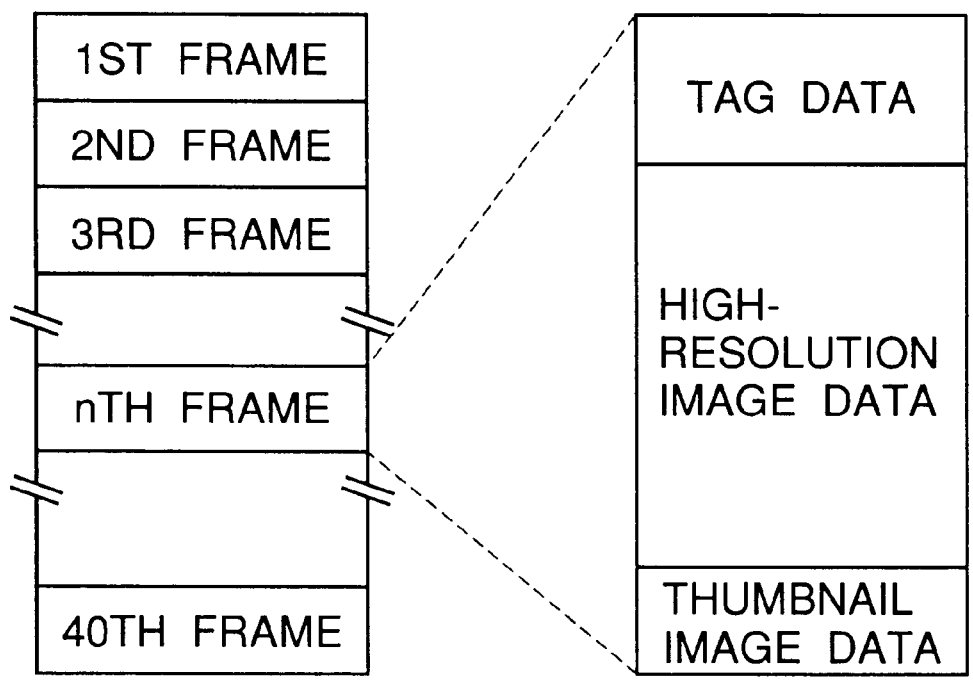
FIG. 6 is a diagram showing the mapping of the data recorded on the memory card by the digital camera of the embodiment.

FIG. 6 shows the mapping of data on the memory card 8. The digital camera 1 is designed to allow recording of a maximum of 40 frames of images on the memory card 8 at the compression rate of ¹⁄₂₀. For each frame are stored tag data, high-resolution image data (640×480 pixels) compressed in compliance with the JPEG standard, and image data for thumbnail display (80×60 pixels). The recorded images can be handled frame by frame, for example, as EXIF-format image files.

When the shooting/playback mode setting switch 14 is set for the playback mode, the data of the image having the greatest frame number within the memory card 8 is read to be subjected to data decompression by the playback image generator 211h and then transferred to the VRAM 210. As a result, the image having the greatest number, i.e. the most recently shot image, is displayed on the LCD 10. By operating the down switch 7, the image having a smaller frame number is displayed; by operating the up switch 6, the image having a greater frame number is displayed.

Hereafter, the flow of control performed in connection with supply of electric power and display of an image in the digital camera 1 will be described with reference to the flow chart shown in FIG. 7. To alleviate depletion of the battery E, the digital camera 1 is provided with an automatic-monitor-off function of, when no operation is performed in the operation unit 250 for a predetermined length of time, shutting off supply of electric power to the video circuit V to stop display and an automatic-power-off function of, in such a situation, shutting off supply of electric power to the entire digital camera to stop operation thereof as a whole. Stopping display by the automatic-monitor-off function helps reduce consumption of electric power, and stopping operation of the entire digital camera by the automatic-power-off function helps completely stop consumption of electric power. The digital camera 1 is designed to keep the automatic-power-off function disabled when it operates on electric power fed from the outside by an AC adapter.

First, when the power is turned on, then, in step S10, whether the LCD 10 was off or not when the power was turned off last time is checked. To achieve this, every time the power is turned off, the on/off state of the LCD 10 at that moment is written to a non-volatile memory (not shown) provided within the overall controller 211. When the power is turned on next time, the LCD 10 is brought into the same state as it was when the power is turned off last time.

If the LCD 10 was not off when the power was turned off last time, then, in step S20, the video circuit V is energized to turn on the LCD 10. In addition, the automatic-monitor-off timer is reset so as to be restarted. Once the entire digital camera is de-energized, its restarting takes a relatively long time; by contrast, recovery from the automatic-monitoring-off state can be achieved simply by energizing the video circuit again and thus in a short time.

Next, in step S30, various operations are performed with an image displayed on the LCD 10 (called the live-image viewing mode). The operations performed in step S30 are repeated any number of times in accordance with the check result in the next step S40, and the operations performed the second time and later are performed in accordance with how the operation unit 250 is operated. For example, if the shooting/playback mode setting switch 14 is operated, switching between the shooting and playback modes is performed; if the shutter button 9 is operated in the shooting mode, an image shot, constituting one frame, is recorded on the memory card 8; if the up switch 6 or the down switch 7 is operated in the shooting mode, the image reproduced for display is switched to another image.

Then, in step S40, whether any operation has been performed in the operation unit 250 or not is checked. If the check result is true, then, in step S50, the automatic-monitor-off timer is reset, and the flow returns to step S30. If the check result is false, i.e. if no operation has been performed, then, in step S60, the count value of the automatic-monitor-off timer is checked to see whether no operation has been performed for a predetermined length of time (for example, three minutes). If the check result in step S60 is false, then, in step S70, the automatic-monitor-off timer is incremented, and the flow returns to step S30.

If the check result in step S60 is true, i.e. if no operation has been performed for the predetermined length of time or longer, then, in step S90, the automatic-power-off timer is reset and started. Then, the video circuit is de-energized, and the flow proceeds to step S100. At this time, display on the LCD is stopped, but the object can be observed through the optical viewfinder 31. When the video circuit is de-energized, the fact that the LCD 10 is off at that moment is stored in the memory for use in the checking performed in step S10 next time.

In step S100, various operations using the optical viewfinder are performed (called the optical viewfinder mode). In the optical viewfinder mode, it is possible to perform any operation other than display of a reproduced image. Next, in step S110, whether any operation has been performed in the operation unit 250 or not is checked. If any operation has been performed, then, in step S120, the automatic-power-off timer is reset, and then, in step S130, whether what has been operated is one of the power switch PS and the display switch 17 or not is checked. If the check result in step S130 is true, the flow returns to step S10, and at this time the fact that the LCD 10 is on is stored in the memory. As a result, the video circuit is energized to display an image on the LCD 10 again for live-image viewing.

As described previously, when the automatic-monitor-off function is in action, it is difficult for the user to distinguish it from the automatic-power-off function. It is of course possible to provide an additional indicator to allow the user to distinguish the state in which the automatic-monitor-off function is in action from the state in which the power has been turned off by the automatic-power-off function. However, even then, since the LCD 10, which is the most prominent feature of a digital camera, remains off, it is still difficult to distinguish the two states at a glance. Consequently, it is very likely that the user erroneously operates the power switch in an attempt to start the digital camera again, believing that the power has been turned off by the automatic-power-off function while the fact is that the digital camera is simply in the automatic-monitor-off state.

This, however, is annoying because the automatic-monitor-off state is a state in which only the video circuit is kept off, and therefore operating the power switch in this state causes the power to be turned off actually. In this case, since operating the power switch does not start the digital camera, the user has the impression that the digital camera is out of order. The digital camera can be restarted by operating the power switch once again, but needs to be started from scratch, which takes a relatively long time.

In the digital camera 1, when display is disabled by the automatic-monitor-off function, the power switch PS is assigned a function of restarting display, which is different from the function it has otherwise. This makes it possible to avoid inconvenience as described above associated with conventional digital cameras.

Moreover, although it is difficult for the user to distinguish the automatic-monitor-off state from the state in which the power has been completely turned off by the automaticpower-off function, it is possible to distinguish the two states readily by operating the display switch 17; specifically, in the automatic-power-off state, display is not restarted even when the display switch 17 is operated.

If what has been operated is neither the power switch PS nor the display switch 17, then the flow returns to step S100 to maintain the optical viewfinder mode.

If the check result in step S110 is false, then, in step S140, the count value of the automatic-power-off timer is checked to see whether no operation has been performed for a predetermined length of time (for example, five minutes). If the length of time without any operation has not yet reached the predetermined length of time, then, in step S150, the count value of the automatic-power-off timer is incremented, and the flow returns to the step S100.

If the check result in step S140 is true, then, in step S160, whether electric power is supplied from an AC adapter or not is checked. If the check result is false, i.e. if electric power is supplied from the battery, then, in step S180, the power is turned off. By contrast, if the check result in step S160 is true, then, in step S170, the automatic-power-off timer is reset so as to be restarted again. That is, when an AC adapter is used, the power-off-timer is disabled.

In the above-described flow of control, when a predetermined length of time has elapsed after completion of operation, display on the LCD 10 is stopped (S10, S90) irrespective of whether electric power is supplied from the battery E or an AC adapter, and, when a predetermined length of time has further elapsed thereafter, supply of electric power is stopped (S140, S160, S180) if electric power is supplied from the battery. That is, the time after completion of operation is managed in two stages, and the power source is checked in the second stage.

Figure 8:
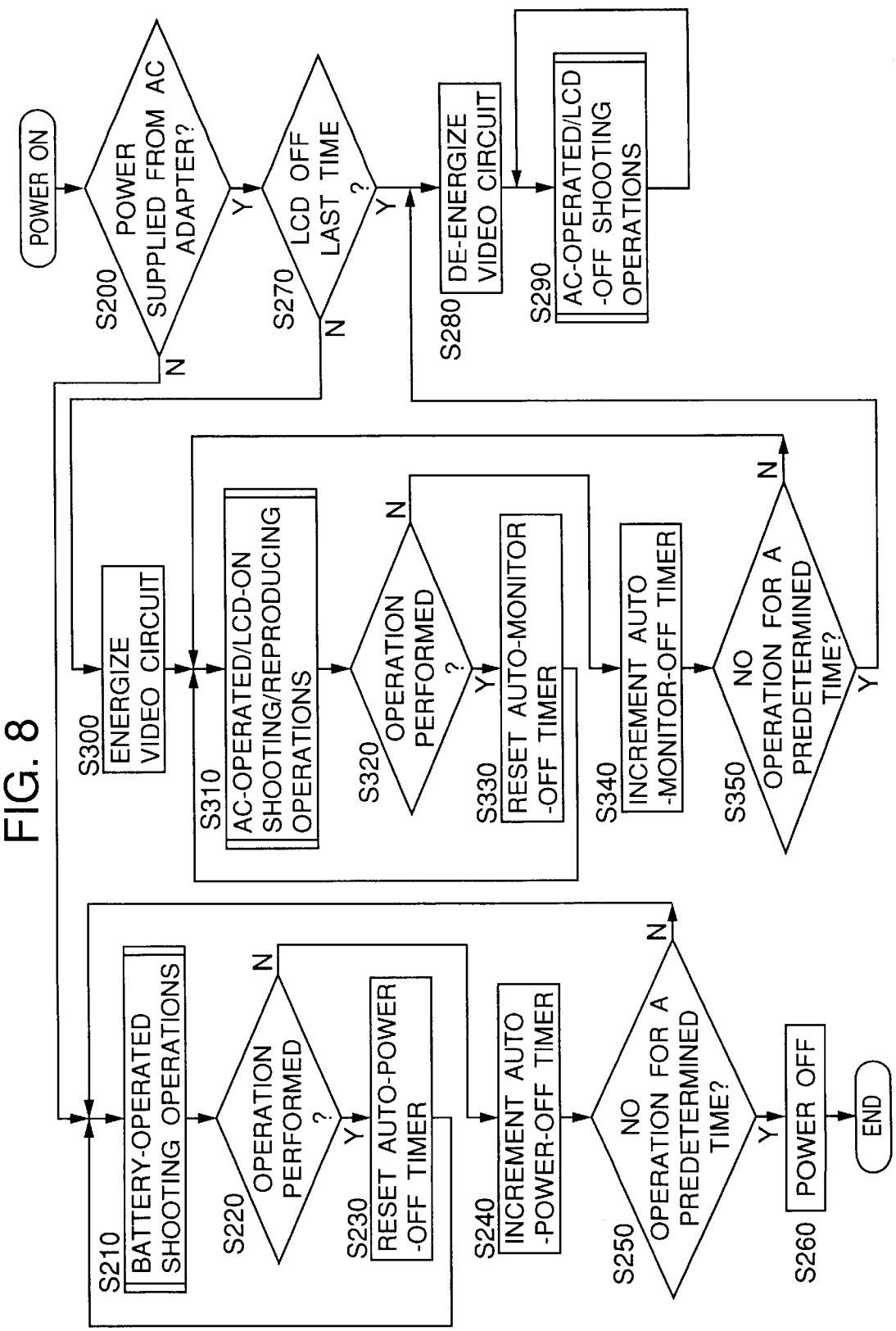

Alternatively, it is also possible to check in advance whether electric power is supplied from the battery or from an AC adapter so that, when no operation is performed, the flow of control performed in connection with supply of electric power and display of an image proceeds in one way when the battery is used and in another way when an AC adapter is used. Hereafter, the flow of control of this type will be described with reference to the flow chart shown in FIG. 8.

First, when the power is turned on, then, in step S200, whether electric power is supplied from an AC adapter or not is checked. If electric power is not supplied from an AC adapter, then, in step S210, shooting operations that the digital camera 1 performs when operating from the battery are performed. These operations include displaying an image on the LCD 10 by energizing the video circuit V.

Next, in step S220, whether any operation has been performed in the operation unit 250 or not is checked. If the check result is true, then, in step S230, the automatic-power-off timer is reset, and the flow returns to step S210. If the check result in step S220 is false, then, in step S240, the count value of the automatic-power-off timer is incremented. Then, in step S250, whether no operation has been performed for a predetermined length of time (for example, three minutes) is checked. If the check result is false, i.e. if any operation has been performed, then the flow returns to step S210. If the check result in step S250 is true, then, in step S260, the power is turned off.

Thus, when the battery is used as a power source, supply of electric power is shut off automatically when no operation is performed for the predetermined length of time irrespective of whether the video circuit V is on or off.

On the other hand, when the check result in step S200 shows that electric power is supplied from an AC adapter, then, in step S270, whether the LCD 10 was off or not when the power was turned off last time is checked. If the check result is true, then, in step S280, supply of electric power to the video circuit V is shut off. Then, in step S290, shooting operations that the digital camera 1 performs when operating from an AC adapter with the LCD 10 off are performed.

If the check result in step S270 shows that the LCD 10 was on when the power was turned off last time, then, in step S300, supply of electric power to the video circuit V is started, and then, in step S310, shooting or reproducing operations that the digital camera 1 performs when operating from an AC adapter with the LCD 10 on are performed. Next, in step S320, whether any operation has been performed in the operation unit 250 or not is checked. If the check result is true, then, in step S330, the automatic-monitor-off timer is reset, and the flow returns to step S 310.

If the check result in step S320 is false, then, in step S340, the count value of the automatic-monitor-off timer is incremented. Then, in step S350, whether no operation has been performed for a predetermined length of time (for example, five minutes) is checked. If the check result is false, i.e. if any operation has been performed, then the flow returns to step S310. If the check result in step S350 is true, then, in step S280, supply of electric power to the video circuit V is shut off. Thereafter, in step S290, shooting operations that the digital camera 1 performs when operating from an AC adapter with the LCD 10 off are performed.

Note that the technique of disabling the automatic-power-off function when the digital camera is operating on electric power fed from an AC adapter is applicable not only to the shooting and playback modes, but also during data transfer to an external device such as a personal computer and also in a mode for managing the image data recorded by the digital camera. Moreover, since the principal object of the present invention is achieved by avoiding the display unit being energized for many hours an AC adapter is used, it is also possible to refrain from supplying electric power to the display unit from the beginning when an AC adapter is used. Moreover, although the above-described examples assume the use of commercial alternating-current power as an external power source, it is also possible to use any other external power source. For example, it is possible to use a car battery, and in that case a DC/DC converter is used in place of an AC adapter.

In the embodiment described above, the display is built into the camera body; however, the display may be so formed as to be detachably attachable to the camera body.

The embodiment described above deals with a digital camera; however, the present invention is applicable to any device having a display and powered by an external/internal power source.

Obviously, many modifications and variations of the present invention are possible in light of the above teachings. It is therefore to be understood that within the scope of the appended claims, the invention may be practiced other than as specifically described.

What is claimed is:

1. A device that operates from an internal power source or from an external power source, comprising:
   a display for displaying an image; and
   a controller that counts time that has elapsed after execution of a predetermined operation so that, if the device is operating from the internal power source, operation of the entire device is ended when a predetermined length of time has been counted and, if the device is operating from the external power source, operation of the display is ended but operation of other portions of the device is continued when a predetermined length of time has been counted.

2. A device as claimed in claim 1, wherein the controller counts time that has elapsed after operation of one of a plurality of switches included in the device.

3. A device as claimed in claim 2, wherein the switches include a power switch.

4. A device as claimed in claim 3, wherein operation of the display is restarted when the power switch is operated while operation of the other portions of the device is being continued.

5. A device that operates from an internal power source or from an external power source, comprising:

a display for displaying an image; and a controller that, when no operation has been performed for a predetermined length of time, ends operation of the entire device, if the device is operating from the internal power source, and ends operation of the display but continues operation of other portions of the device, if the device is operating from the external power source.

6. A device as claimed in claim 5, wherein the controller counts time that has elapsed after operation of one of a plurality of switches included in the device.

7. A device as claimed in claim 6, wherein the switches include a power switch.

8. A device as claimed in claim 7, wherein operation of the display is restarted when the power switch is operated while operation of the other portions of the device is being continued.

9. A device that operates from one of an internal power source and an external power source, comprising:

a display for displaying an image; and a controller that, when no operation has been performed for a first predetermined length of time, ends operation of the display when the device is operated from one of the internal power source and the external power source, and when no operation has been performed for a second predetermined length of time that is longer than the first predetermined length of time, ends operation of the entire device only if the device is operated from the internal power source.

10. A device as claimed in claim 9, wherein the controller counts time that has elapsed after operation of one of a plurality of switches included in the device.

11. A device as claimed in claim 10, wherein the controller counts the second predetermined length of time by counting time that has elapsed after an end of the first predetermined length of time.

12. A device as claimed in claim 10, wherein the switches include a power switch.

13. A device as claimed in claim 12, wherein operation of the display is restarted when the power switch is operated while operation of the other portions of the device is being continued.

* * * * *